(12) United States Patent
Cummings et al.

(10) Patent No.: US 12,407,500 B2
(45) Date of Patent: Sep. 2, 2025

(54) QUANTUM CRYPTOGRAPHIC KEYS FOR SECURE WIRELESS COMMUNICATIONS IN A TELECOMMUNICATIONS NETWORK

(71) Applicant: T-Mobile USA, Inc., Bellevue, WA (US)

(72) Inventors: George Cummings, Bellevue, WA (US); Brett Christian, Bellevue, WA (US); Scott Probasco, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 468 days.

(21) Appl. No.: 17/537,253

(22) Filed: Nov. 29, 2021

(65) Prior Publication Data
US 2023/0171093 A1    Jun. 1, 2023

(51) Int. Cl.
| | |
|---|---|
| *H04L 29/00* | (2006.01) |
| *G06N 10/40* | (2022.01) |
| *H04L 9/08* | (2006.01) |
| *H04W 12/041* | (2021.01) |

(52) U.S. Cl.
CPC .......... *H04L 9/0858* (2013.01); *G06N 10/40* (2022.01); *H04W 12/041* (2021.01)

(58) Field of Classification Search
CPC ......... H04L 9/0858; H04L 9/14; G06N 10/40; G06N 10/60; H04W 12/041
See application file for complete search history.

(56) References Cited

U.S. PATENT DOCUMENTS

| | | | |
|---|---|---|---|
| 7,135,700 | B2 | 11/2006 | Lofts |
| 7,697,693 | B1 | 4/2010 | Elliott |
| 8,082,443 | B2 | 12/2011 | Troxel et al. |
| 8,457,316 | B2 | 6/2013 | Brodsky et al. |
| 8,781,129 | B2 | 7/2014 | Bush et al. |
| 9,123,114 | B2 | 9/2015 | Meyers et al. |

(Continued)

FOREIGN PATENT DOCUMENTS

| | | |
|---|---|---|
| CN | 107483189 B | 6/2019 |
| CN | 107689866 B | 7/2019 |

(Continued)

*Primary Examiner* — Don G Zhao
(74) *Attorney, Agent, or Firm* — Perkins Coie LLP

(57) ABSTRACT

The disclosed technology includes a technique for securing communications over a wireless telecommunications network. Quantum entangled particles are generated and optically communicated to a wireless endpoint device (e.g., smartphone) within Line-of-Sight (LOS) of the particle generator and optionally to a network access node (e.g., base station). A particle generator can be positioned on a communications tower, mountain, tall building, or other structure that enables greater LOS to multiple endpoint devices and network access nodes. The quantum states of entangled particles are used to generate counterpart cryptographic keys at the wireless endpoint device and network access node. As such, the counterpart keys can secure communications while underlying particles remain quantumly entangled. Moreover, any third-party observation of a quantumly entangled particle would cause collapse of the entanglement, which would render the cryptographic keys inoperable and serve to alert the network that an entangled particle was compromised.

10 Claims, 4 Drawing Sheets

(56) References Cited

U.S. PATENT DOCUMENTS

| | | |
|---|---|---|
| 9,131,128 B2 | 9/2015 | Meyers et al. |
| 9,264,225 B1 | 2/2016 | Hunt et al. |
| 9,294,280 B2 | 3/2016 | Malaney |
| 9,313,180 B1 | 4/2016 | Gray et al. |
| 9,374,376 B2 | 6/2016 | Hunt et al. |
| 9,509,507 B1 | 11/2016 | Hunt et al. |
| 9,518,822 B2 | 12/2016 | Maynard |
| 9,541,946 B2 | 1/2017 | Silverman et al. |
| 9,544,766 B2 | 1/2017 | Hranilovic et al. |
| 9,727,959 B2 | 8/2017 | Meyers et al. |
| 9,754,214 B1 | 9/2017 | Glaser |
| 9,800,399 B2 | 10/2017 | Tanzilli et al. |
| 9,867,112 B1 | 1/2018 | Schwengler et al. |
| 10,186,059 B2 | 1/2019 | Musters et al. |
| 10,361,848 B2 | 7/2019 | Gray et al. |
| 10,432,395 B2 | 10/2019 | Howe et al. |
| 10,432,663 B2 | 10/2019 | Kurian |
| 10,554,397 B2 | 2/2020 | Howe et al. |
| 10,567,964 B2 | 2/2020 | Tenny et al. |
| 10,594,694 B2 | 3/2020 | Bendersky et al. |
| 10,623,951 B2 | 4/2020 | Palanigounder et al. |
| 10,644,882 B2 | 5/2020 | Kurian |
| 10,694,485 B2 | 6/2020 | Yu et al. |
| 10,855,457 B1* | 12/2020 | Vakili .................. H04L 9/0869 |
| 10,958,626 B2 | 3/2021 | Castinado et al. |
| 11,218,300 B1* | 1/2022 | Shea ..................... H04L 9/3247 |
| 11,218,301 B1* | 1/2022 | Shea ..................... H04L 9/0827 |
| 11,223,470 B1* | 1/2022 | Shea ....................... G06F 21/64 |
| 11,240,014 B1* | 2/2022 | Maganti ................. H04L 9/002 |
| 11,322,050 B1* | 5/2022 | Arbajian ................. G09C 1/00 |
| 11,334,667 B1* | 5/2022 | Ramanathan ......... H04L 9/3263 |
| 11,336,462 B1* | 5/2022 | Maganti ................ H04L 9/0656 |
| 11,343,270 B1* | 5/2022 | Carter, Jr. .............. H04L 9/088 |
| 11,366,897 B1* | 6/2022 | Ramanathan ......... H04L 9/3263 |
| 11,449,799 B1* | 9/2022 | Arbajian ............... H04L 9/3247 |
| 11,477,016 B1* | 10/2022 | Carter, Jr. ............. G06F 21/577 |
| 11,533,175 B1* | 12/2022 | Rao ........................ G06N 20/00 |
| 11,552,793 B1* | 1/2023 | Shea ..................... H04L 63/166 |
| 11,601,266 B1* | 3/2023 | Stapleton ............... G06N 10/00 |
| 11,626,983 B1* | 4/2023 | Carter, Jr. ........... G06F 16/2219 380/28 |
| 2002/0184489 A1* | 12/2002 | Mraz ..................... H04L 63/166 713/168 |
| 2005/0005137 A1* | 1/2005 | Benedikt ............... H04L 63/062 713/189 |
| 2005/0095003 A1 | 5/2005 | Huberman et al. |
| 2006/0020679 A1* | 1/2006 | Hinton ................ H04L 63/0815 709/217 |
| 2006/0048216 A1* | 3/2006 | Hinton ................ H04L 63/0815 726/8 |
| 2006/0136990 A1* | 6/2006 | Hinton ................ H04L 63/0815 726/2 |
| 2007/0115898 A1 | 5/2007 | Stein |
| 2007/0272862 A1 | 11/2007 | Desbrandes et al. |
| 2013/0179944 A1* | 7/2013 | Kozlay ................. H04L 9/3234 726/4 |
| 2013/0266328 A1 | 10/2013 | Paller |
| 2014/0059355 A1* | 2/2014 | Schuette ............. G06F 21/6218 713/189 |
| 2014/0068765 A1 | 3/2014 | Choi et al. |
| 2015/0256270 A1 | 9/2015 | Paller |
| 2016/0092871 A1* | 3/2016 | Gordon ................... H04W 4/06 705/44 |
| 2019/0097792 A1* | 3/2019 | Howe ....................... H04L 9/14 |
| 2019/0103962 A1* | 4/2019 | Howe .................... G06F 21/606 |
| 2019/0140829 A1* | 5/2019 | Kurdziel ............... H04L 9/0631 |
| 2019/0243925 A1 | 8/2019 | Baughman et al. |
| 2019/0250889 A1 | 8/2019 | Brandão et al. |
| 2020/0007242 A1 | 1/2020 | Li et al. |
| 2020/0028673 A1* | 1/2020 | Howe ....................... H04L 9/30 |
| 2020/0244373 A1 | 7/2020 | Huberman et al. |
| 2021/0105135 A1 | 4/2021 | Figueroa et al. |
| 2021/0175976 A1 | 6/2021 | Rahman |
| 2021/0176055 A1 | 6/2021 | Rahman et al. |
| 2022/0094442 A1* | 3/2022 | Isaacson ................ G06N 10/00 |
| 2022/0174095 A1* | 6/2022 | Rahman ................ H04L 9/0852 |
| 2022/0337394 A1* | 10/2022 | Farris ................... H04L 9/0662 |
| 2023/0163975 A1* | 5/2023 | Kelly .................... H04L 9/0643 713/168 |

FOREIGN PATENT DOCUMENTS

| | | |
|---|---|---|
| CN | 110138550 A | 8/2019 |
| CN | 109982410 B | 4/2020 |
| CN | 110213060 B | 4/2020 |
| CN | 111200582 A | 5/2020 |
| CN | 106960343 B | 7/2020 |
| CN | 109327308 B | 8/2020 |
| CN | 108512659 B | 10/2020 |
| CN | 109167663 B | 10/2020 |
| CN | 111953427 A | 11/2020 |
| CN | 108365955 B | 12/2020 |
| CN | 108898708 B | 12/2020 |
| CN | 110943833 B | 3/2021 |
| CN | 112994878 A | 6/2021 |
| EP | 1522020 A2 | 4/2005 |
| EP | 3195642 A1 | 7/2017 |
| EP | 3198787 A1 | 8/2017 |
| EP | 3340494 A1 | 6/2018 |
| EP | 3465556 A1 | 4/2019 |
| EP | 3777320 A1 | 2/2021 |
| KR | 20200086729 A | 7/2020 |
| WO | 2014121524 A1 | 8/2014 |
| WO | 2020140851 A1 | 7/2020 |
| WO | 2020142033 A1 | 7/2020 |
| WO | 2020167289 A1 | 8/2020 |
| WO | 2020229274 A1 | 11/2020 |
| WO | 2020257124 A1 | 12/2020 |
| WO | 2020263618 A1 | 12/2020 |
| WO | 2021108813 A2 | 6/2021 |
| WO | 2021171248 A1 | 9/2021 |

* cited by examiner

QUANTUM CRYPTOGRAPHIC KEYS FOR SECURE WIRELESS COMMUNICATIONS IN A TELECOMMUNICATIONS NETWORK

BACKGROUND

The onset of 5G wireless communications brings about even greater security challenges for networks that support numerous and different types of ultrahigh-speed communications among a massive number of connected devices. For example, 5G networks support massively interconnected devices for Internet-of-Things (IOT), Mobile Broadband (MBB), Vehicle-to-Everything (V2X), Machine-to-Machine (M2M), Machine-to-Everything (M2X), Ultra-Reliable Low Latency Communication (URLLC), Machine-Type Communication (MTC), and other communications. Each of these communication types may have different transmission and latency requirements.

Most interconnected devices and their communications are safe, dependable, and reliable; however, a fraction of the communications and devices pose serious security risks to 5G networks. For example, mobile broadcast sessions can connect in unsecured and/or rogue rural area networks that are unsecure. The vulnerabilities cannot be addressed with conventional network hardening techniques because deployment across a massively diverse network of devices is cost-prohibitive, resource intensive, and thus impractical.

Authentication is an indispensable process to secure communications between network access nodes and wireless endpoint devices such as IoT devices or smartphones. In one example, wireless endpoint devices go through a process of provisioning communications resources through the generation and exchange of keys or other reference data that ensures functioning and secure communications between the wireless endpoint devices and network access nodes. However, a key exchange process for securing communications is risky because keys can be compromised and used to impersonate a device. As a result, a bad actor can circumvent security measures and perform malicious activities on the network.

BRIEF DESCRIPTION OF THE DRAWINGS

Detailed descriptions of implementations of the present invention will be described and explained through the use of the accompanying drawings.

Figure 1:
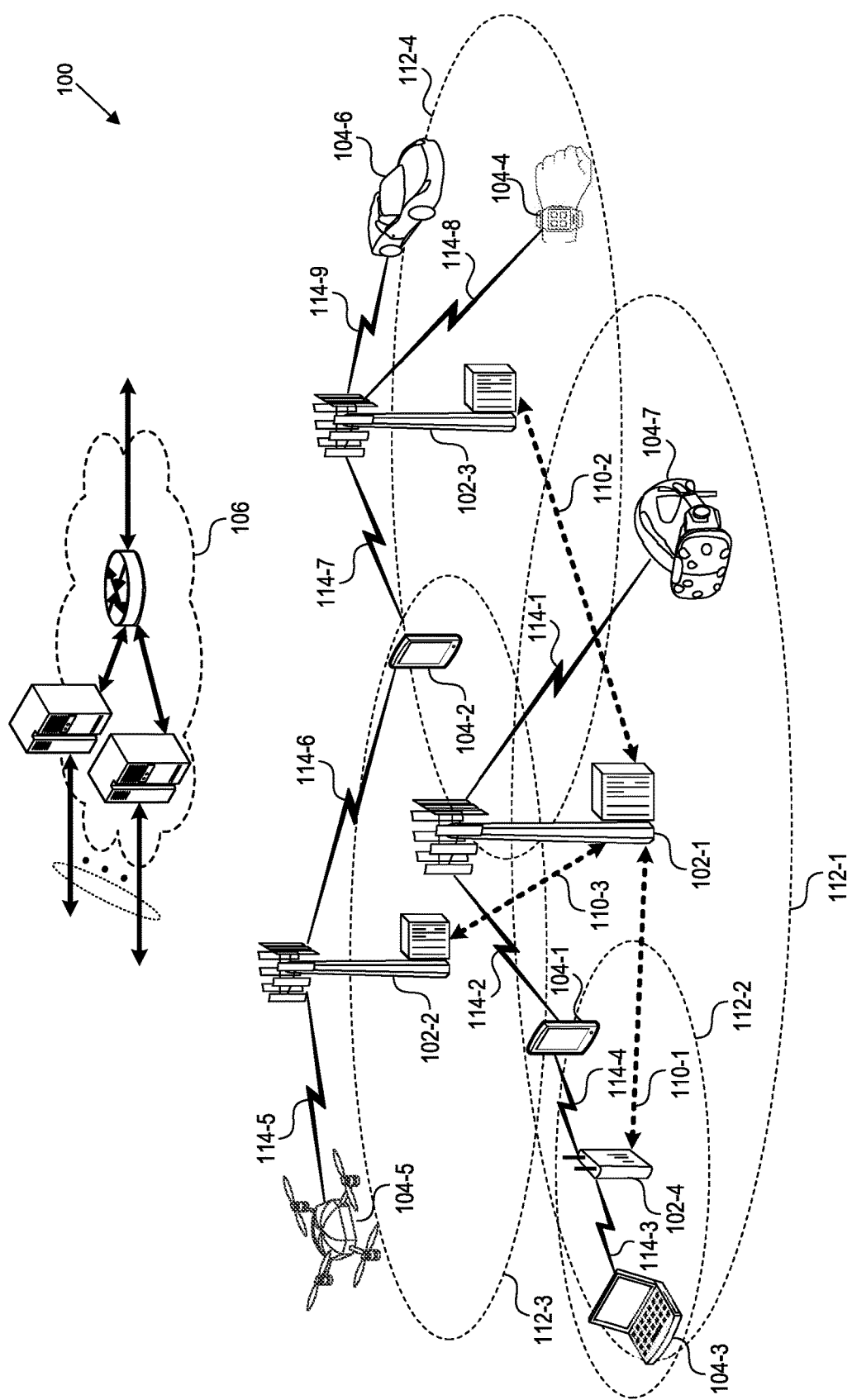
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology includes a technique for securing communications over a wireless telecommunications network between a wireless endpoint device and a network access node (NAN). Pairs of quantum entangled particles are generated, and a particle of each pair is optically communicated to the wireless endpoint device (e.g., smartphone) within Line-of-Sight (LOS) of the particle source. The other particle of each pair is optically communicated or kept at the NAN (e.g., base station). The quantum states of entangled particles are used to generate counterpart quantum cryptographic keys ("quantum keys") at each of the wireless endpoint device and the NAN by performing an operation on only one of each pair of the quantum entangled particles, which simultaneously affects the quantum state of the other entangled particles. As such, the quantum keys are generated to secure communications while the underlying particles remain quantumly entangled. A quantum entangled particle pair remains entangled until used, for example, either by using that particle to generate a bit for quantum keys or used/observed by a bad actor attempting to intercept the key. Any third-party observation of a quantumly entangled particle would cause collapse of the entanglement, which would render the quantum keys ineffective and serve to alert the network of the attempted malicious activity.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of NAN that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the wireless telecommunications network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (ARNR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE) wireless endpoint device, a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

Quantum Keys for Secure Communications

A cryptographic key is a string of data that is used to lock or unlock cryptographic functions, including authentication, authorization, and encryption. Cryptographic keys ("keys") are grouped into types according to the functions that they perform. In one implementation, keys are exchanged between two parties, allowing use of a cryptographic algorithm to authenticate a device and communications between a network and the device. In one example, each endpoint device is equipped to encrypt messages to be sent and decrypt messages received. The nature of the equipping that is required depends on the encryption technique that is used. If a code is used, both will require a copy of the same codebook. If a cipher is used, both will need appropriate keys. If the cipher is a symmetric key, both will need a copy of the same key. If the cipher is an asymmetric key with the public/private key property, both will need the other's public key.

To establish a secure communication channel, a key exchange process requires two parties to exchange a secret key so that each party can encrypt messages before sending and decrypt received messages. Symmetric-key cryptography utilizes a single key to encrypt and decrypt messages. A problem with symmetrical cryptography, is that it requires a secret key to be communicated through trusted agents or any other secure communication channel. If the two parties cannot establish a secure initial key exchange, they cannot communicate securely without the risk of messages being intercepted and decrypted by a third-party who acquired the key during the key exchange.

Asymmetric-key cryptography uses a pair of public and private keys, where messages are encrypted with one key and decrypted with the other. For example, the private key can be used for decrypting messages or for authenticating. The public key can be sent over non-secure channels or shared in public while the private key is only available to its owner. An encryption key can be openly communicated as it poses no risk to the confidentiality of encrypted messages. In particular, one party exchanges the keys to another party where they can then encrypt messages using the key and send back the cipher text. Only the decryption key (e.g., the private key) can decrypt that message. A problem that remains is to ensure that a public key actually belongs to its supposed owner. It is possible to "spoof" another's identity in any of several ways, particularly when the two users involved have never met and know nothing about each other.

Public key infrastructures (PKIs) can address the problem of identity authentication. In one implementation, each user applies to a trusted "certificate authority" (CA) for a digital certificate that serves as a tamperproof authentication of identity. The infrastructure is safe, unless the CA itself is compromised. In case it is, though, many PKIs provide a way to revoke certificates so other users will not trust them. Revoked certificates are usually put in certificate revocation lists which any certificate can be matched against.

The disclosed technology improves over existing key exchange technologies by generating quantum cryptographic keys ("quantum keys") based on pairs of particles that are quantumly entangled. In one implementation, two network nodes at ends of a communications link each receive a sequence of counterpart particles that are quantumly entangled. Operations can be performed on the sequence of entangled particles at either of the two network nodes, where an operation can include processing a particle through a filter to set/change a quantum state. The counterpart entangled particle at the other network node has its quantum state simultaneously set/changed in response to the entangled particle that was processed through the filter. The quantum states of the entangled particles are mapped to bit values (e.g., 0, 1) that are used to simultaneously generate quantum keys for the two network nodes without ever needing to communicate information over a communications channel about the quantum states between the two network nodes. Further, detecting the quantum state of any entangled particle by a third-party causes disentanglement, which renders the quantum keys inoperable and can alert the network that a particle has been compromised.

Specifically, quantum entanglement is the phenomenon of quantum mechanics in which two entangled particles (e.g., photons) share a common wave function until one of the pair is interacted with or observed, at which time the wave function collapses down to a known state, with one particle being the exact opposite state as the other. Thus, a sequence of particles that are mapped to binary values at one network node can be determined by processing the counterpart sequence of entangled particles at the other network node with an XOR Boolean operation, for example. The pair must be a particle and its anti-particle that are created at the same time. The concept of using quantum entanglement to provide a secure way to communicate can be performed over fiber and over the air.

Quantum key distribution exploits certain properties of quantum physics to ensure security. It relies on the fact that observations (or measurements) of a quantum state introduces perturbations in that state. Over many systems, these perturbations are detectable as noise by the receiver, making it possible to detect man-in-the-middle attacks. Beside the correctness and completeness of quantum mechanics, the protocol assumes the availability of an authenticated channel between two individuals.

In one example, an entangled pair is created by a particle generator A, and then each particle of the pair is sent to opposite ends of a communication link via fiber optic cable to network node B and network node C. Once the entangled pair is in place, the communication system can communicate one bit by performing an operation on one particle at one end. Once the bit is used, entanglement is broken, and a new entangled pair can be sent. In an example, particle generator A could constantly feed newly generated entangled particles to the network node B and network node C. The particle pair that is created by the particle generator A includes a particle and an antiparticle that has the same mass but has an opposite property. For example, the antiparticle of an electron is a positron. While the electron has a negative electric charge, the positron has a positive electric charge. An example of a type of particle suitable for quantum entanglement communications includes a photon, which is neutral and is its own antiparticle.

Figure 2:
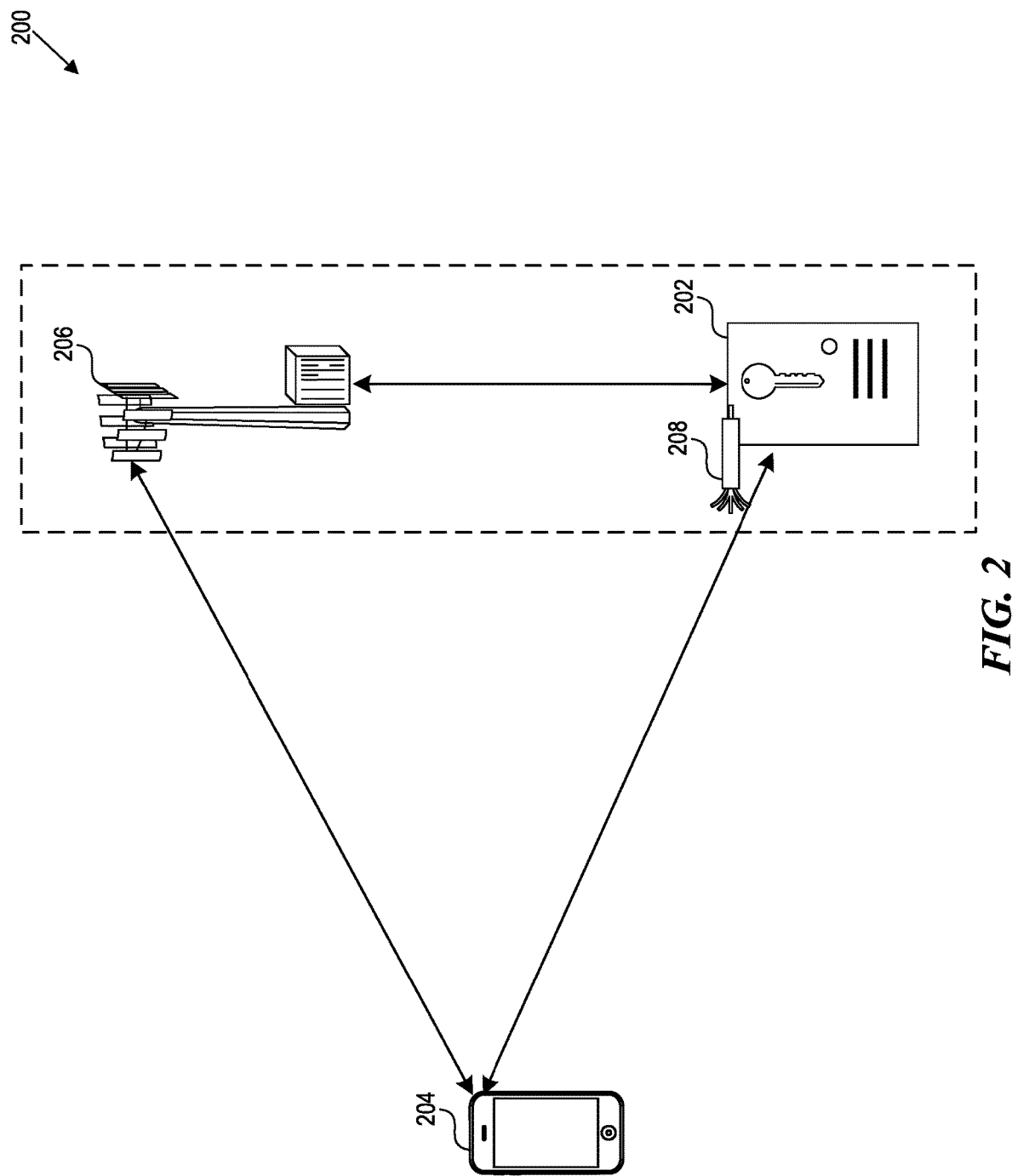
FIG. 2 is a block diagram that illustrates an architecture for generating and using quantum cryptographic keys in a wireless telecommunications network.

FIG. 2 is a block diagram that illustrates a system 200 for generating and using quantum keys in a wireless telecommunications network. As shown, a source of quantum particles is particle generator 202, which is coupled to network nodes including a wireless endpoint device 204 (e.g., mobile device, fixed wireless access device) and a network access node (NAN) 206 (e.g., gNB). Over-the-air delivery of entangled particles to the network nodes allows for quantum key exchange to be accomplished via entangled particles. To use entanglement for mobile communications, the particle generator 202 generates an entangled pair and then transmits the two particles of a pair to respective ends of a communication link including the wireless endpoint device 204 and the NAN 206.

In the illustrated example, the particle generator 202, the wireless endpoint device 204, and the NAN 206 are all remotely located from each other. The particle generator 202 includes or is coupled to an optical communication device 208 (e.g., laser generator, fiber optic cable) via which particles can be transported to the wireless endpoint device 204 and the NAN 206. In another example, the particle generator 202 and the NAN 206 are co-located. As such, the NAN 206 can generate and transmit one particle of the entangled pair to the wireless endpoint device 204 and keep the other entangled particle.

In one example, entangled particles are delivered using a laser or other optical means. Using a laser requires Line-of-Sight (LOS) between the source of particles and the wireless endpoint device 204. However, modern mobile communication systems often operate in non-LOS conditions, making delivery of a laser-based entangled particle to a wireless mobile device unrealistic if delivered from the remotely located particle generator 202 or NAN 206. The particle generator 202 could be one or many distributed particle generators that are located at heights sufficient to have a LOS view of both network access nodes and wireless endpoint devices. In one example, the particle generators are located at the top of a tower, trees, buildings, and mountains. In another example, particle generators include near-ground non-terrestrial networks such as high-altitude platform station (HAPS) systems or UAVs unmanned aerial vehicles (UAVs) such as autonomous vehicles or drones.

Quantum key exchange can provide secure communications between network nodes that is tamperproof because entanglement of particles is destroyed when observed (e.g., by a third-party). Specifically, quantum entanglement is a physical phenomenon that occurs when a group of particles are generated, interact, or share spatial proximity in a way such that the quantum state of each particle of the group cannot be described independently of the state of the others, including when the particles are separated by a large distance. Measurements of physical properties such as position, momentum, spin, and polarization performed on entangled particles can, in some cases, be found to be perfectly correlated. For example, if a pair of entangled particles is generated such that their total spin is known to be zero, and one particle is found to have clockwise spin on a first axis, then the spin of the other particle, measured on the same axis, is found to be counterclockwise. In this way bits can be communicated from a distant location by manipulating the entangled particle at the other location. For example, polarizing an entangled particle at zero degrees to 180 degrees could be used to communicate a 1 bit, while the reverse polarization could be used to communicate a 0 bit. However, this behavior gives rise to seemingly paradoxical effects: any measurement of a particle's properties results in an irreversible wave function collapse of that particle and changes the original quantum state. Thus, with entangled particles, such measurements affect the entangled system as a whole. To address this phenomenon, new quantum pairs can be regularly fed to the network nodes at ends of a communication link.

The quantum keys are a perfect counterpart pair while the particles are entangled. Processing bits represented by a sequence of entangled particles at one network node through an XOR function would provide the same sequence of underlying bits of the counterpart quantum key at the other network node of a communications link. Moreover, a change in a property of one particle could be instantaneously reproduced by the counterpart entangled particle. That is, the spin, orientation, or other physical property of one particle that represents a bit, would cause the counterpart particle to have a corresponding change in its representation of a bit. As such, a sequence of particles at a network node can represent a sequence of bits for a quantum key used to encrypt/decrypt messages communicated over a communications link with a NAN that has a counterpart quantum key based on an underlying sequence of counterpart entangled particles. On the other hand, once entanglement collapses, the quantum keys are no longer operable and, as such, the ability to encrypt/decrypt communications sent between the two ends of the link is lost. Given that observing the particles causes collapse of entanglement, a third-party who observes entangled particles would necessarily cause their ability to function as keys to be destroyed, thereby further securing the network.

The number and frequency of entangled pairs that are communicated to the ends of a communications link can vary based on the degree of security that is desired for communications. For example, a first set of entangled pairs can be communicated to each end periodically (e.g., every 30 seconds) for use to encrypt/decrypt communications only for a period. A higher frequency of delivered entangled pairs would provide greater security compared to a lower frequency. For example, a steady stream of entangled pairs that are communicated to ends of a communications link would provide a highest level of encryption security but at a tradeoff that LOS would need to be maintained, which is unlikely, especially in mobile communications. Accordingly, an optimal frequency with which quantum pairs are communicated could be a function of the mobility of the ends of the communications link. Thus, a wireless endpoint device that is moving irregularly or rapidly would receive an entangled particle less frequently or resort to a conventional key exchange process until LOS is re-established. Thus, the network nodes can dynamically switch between using quantum keys and conventional cryptographic keys, when necessary. For example, gNBs and/or UEs that are not within LOS of an entangled particle generator can switch to using a conventional non-quantum key exchange until LOS is re-established.

Figure 3:
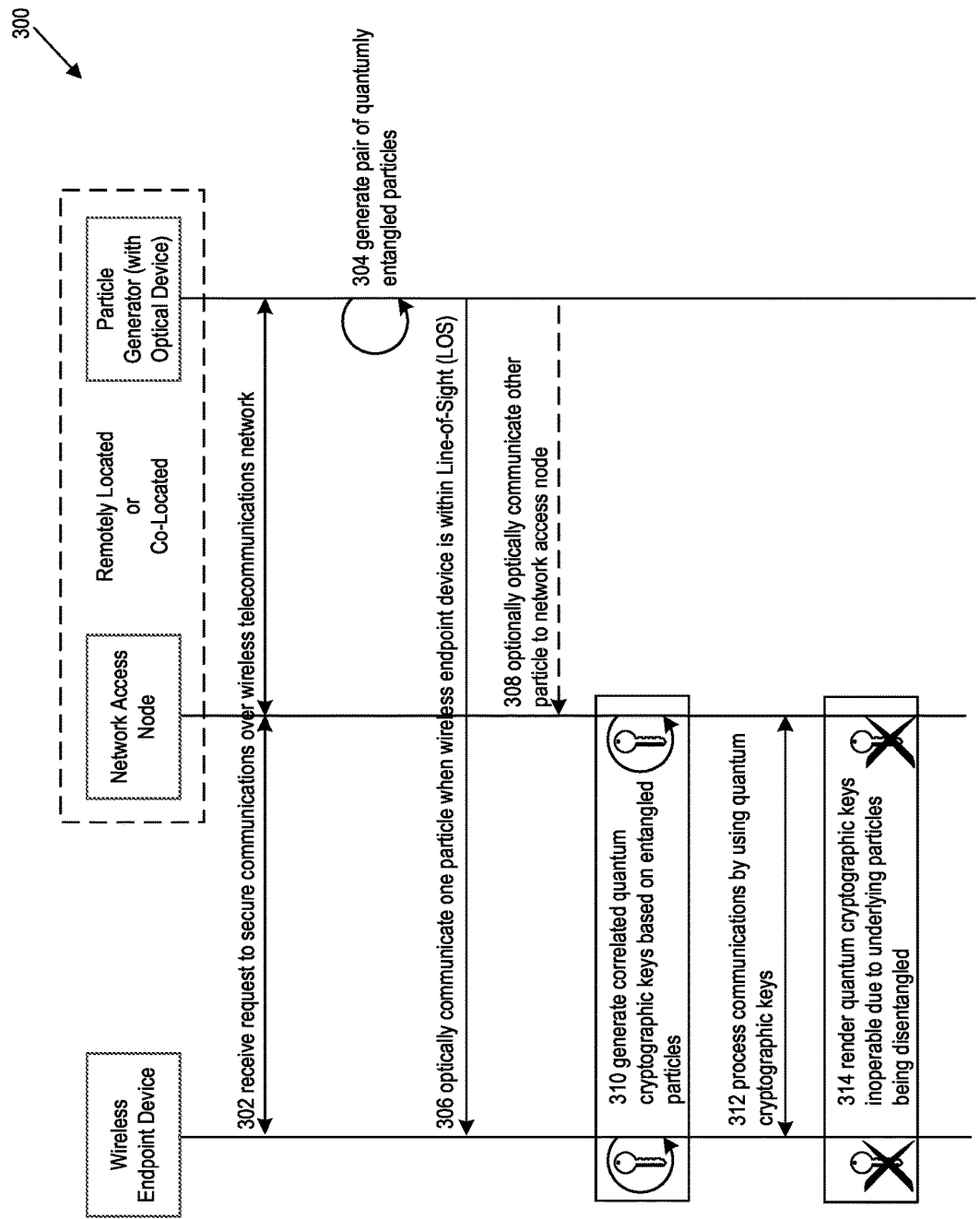
FIG. 3 is a flowchart that illustrates a process for securing communications on a wireless telecommunications network by using quantum cryptographic keys.

FIG. 3 is a flowchart that illustrates a process 300 for securing communications on a wireless telecommunications network ("network") by using quantum keys. The process 300 can be performed by a security system ("system"), which can include a particle generator configured to generate entangled particles as the underlying basis for generating quantum keys that are used to secure communications on the network. The system can include components that are distributed in different locations of the network and/or co-located with components of the network. For example, the particle generator and associated optical communication device (e.g., laser generator, fiber optic cable) can be co-located with a NAN. Moreover, each of a wireless endpoint device and NAN can have a component of the system to generate quantum keys based on the entangled particles.

At 302, the system can obtain a request to secure a communication between a wireless endpoint device (e.g., mobile device, fixed-wireless access device) and a NAN (e.g., base station) of the network. For example, a wireless mobile device can receive or issue a request to establish secure communications with a gNB on a 5G network. In another example, the gNB seeks to establish a secure communications link with the wireless mobile device and communicates a request to do so, which causes the particle generator to generate entangled particles for quantum keys.

At 304, the system can generate a pair of particles including a first particle and a second particle that are quantumly entangled. A particle generator of the system can generate multiple pairs (e.g., a sequence, finite set, continuous stream) of quantum entangled particles where a quantum state of each particle of the pair is correlated with the other. The particle generator can be one of multiple particle generators that are distributed at different locations within a coverage area of the network. For example, an array of particle generators (and associated optical communication devices) can be co-located but face in different directions to cover a volume of space. In another example, one or more particle generators are located on buildings or other tall structures that provide expansive Line-of-Sight (LOS) in areas of high traffic of wireless devices.

At 306, the system can determine whether the wireless endpoint device is within LOS of the particle generator and, if so, optically communicate the first particle of the pair from the particle generator to the wireless endpoint device. The quantum state of the first particle remains correlated with the quantum state of the second particle regardless of a distance between the first particle at the wireless endpoint device and the second particle at the NAN. LOS is required where the wireless endpoint device is a mobile device, and the optical communication device uses a laser to transport particles from the particle generator to the mobile device. In particular, the optical communication device can include a laser generator that generates pulsed lasers for transporting the particles to the mobile device but only during periods when within LOS. That is, the mobile device is intermittently within LOS of the particle generator and, as such, the optical communication device that uses a laser can only move particles to the mobile device during those times of LOS.

The wireless endpoint device can be a fixed-wireless access device. For example, a wireless endpoint device that has a fixed location can always be within LOS of the particle generator. As such, entangled particles can be communicated with a periodic or continuous laser to the fixed-wireless access device. The fixed-wireless access device does not necessarily need to be within LOS of the particle generator to regularly communicate entangled particles. For example, the optical communication device can include a fiber optic cable that couples the particle generator to the fixed-wireless access device that is not within LOS.

At 308, the second particle of the pair is optionally optically communicated to the NAN. In one example, the particle generator and associated optical communication device are remotely located from the NAN. As a result, a pair of particles need to be communicated to their respective remote locations with the optical communication device. However, the NAN does not need to be in LOS of the particle generator to receive a particle because the optical communication device can include a fiber optic cable. In another example, the optical communication device includes a laser generator such that particles can only be communicated to the NAN via a laser when the NAN is within LOS of the particle generator. In another example, the particle generator and the NAN are co-located. As such, only one particle of a pair of particles needs to be communicated to the wireless endpoint device while the other particle is already located at the NAN.

At 310, components of the system that are co-located at each of the wireless endpoint device and the NAN can each generate a counterpart quantum key based on the first particle and the second particle. In one example, the system performs an operation on the first particle that causes a correlated change to the second particle. For example, the first particle can be processed through a state filter (e.g., polarization filter) to set a quantum state of the first particle (and counterpart second particle) to represent a binary value (e.g., 0 or 1). The quantum states of the particles can relate to physical properties including a position, momentum, spin, and/or polarization of the particles. As such, the quantum states of underlying particles are used to represent bit values.

In one example, the particle generator can periodically generate different sets of pairs of entangled particles for the wireless endpoint device and the NAN. As such, new quantum cryptographic keys can be generated periodically based on the different sets of entangled particles. In another example, the particle generator can continuously generate a stream of entangled particles for securing ongoing communications between the wireless endpoint device and the NAN. As such, the quantum keys are dynamically generated based on the continuous stream of entangled particles, which is cryptographically stronger than using the same keys for periods of time.

At 312, the system causes each of the wireless endpoint device and NAN to process the communication between the wireless endpoint device and the NAN based on the quantum keys such that the communication remains secure while the pairs of particles remain quantumly entangled. The strength of the keys used to process communications can increase in proportion to the number of particles that are used as bits to generate the keys. That is, each quantum key of a key pair can have a matching key size where each bit is based on a particle of a pair of quantum entangled particles. Examples of the key sizes include 8-bit, 64-bit, 128-bit, or 256-bit keys.

When an entangled particle cannot be transmitted to the wireless endpoint device or NAN, the system can use a conventional key exchange process to secure communications. For example, if the system detects that the wireless endpoint device is not within LOS of the particle generator, the wireless endpoint device and NAN can be caused to switch to using conventional cryptographic keys that are not based on quantum entangled particles. However, the conventional keys are less secure than the quantum keys because they can be more easily compromised and used without detection.

At 314, any quantum keys are rendered inoperable due to the entanglement of underlying particles collapsing. This can occur when states of the particles are observed (e.g., properties measured) by anyone including a bad actor. For example, if an entangled particle is compromised while transmitted to a network node, the entanglement collapses and, as such, any cryptographic keys that are based on the disentangled particles are not correlated. The uncorrelated quantum keys are thus inoperable for encrypting or decrypting communications between the wireless endpoint device and the NAN. Moreover, an unexpected inoperable quantum key is indicative of an attempted compromise of the system, which can cause the system to generate an alert of the attempted compromise. Thus, unlike prior systems, the mere attempt to compromise the disclosed system prevents bad actors from actually compromising the system because the required quantum keys become instantly inoperable due to the disentanglement.

An example can include a feedback loop to regulate the particle generator. For example, when any particle of an entangled pair is disturbed by a bad actor, that particle pair (including up to the entire quantum keys) should be discarded, and new particle pairs can be required to generate quantum keys. The particle generator can continue sending particle pairs to the wireless endpoint device and the NAN until the particle generator is notified that the quantum keys have been successfully exchanged. As such, existing data other than the disturbed bit can remain usable for key exchange.

The quantum key technology can secure any communications between network nodes of wireless communications networks. For example, the quantum key exchange process can be implemented in D2D communications between wireless endpoint devices. In yet another example, quantum keys can secure Vehicle-to-Vehicle (V2V), Vehicle-to-Infrastructure (V2I), or Vehicle-to-Everything (V2X) communications. For example, a convoy of trucks moving down a highway can use quantum keys to secure communications for coordinating driving (e.g., when to accelerate, when to brake). The particle pairs can be communicated to any wireless network nodes when within LOS of a source of particle pairs. Moreover, the secure communications based on quantum keys can be offered by a mobile network operator as a subscription service or on demand.

Additionally or alternatively, quantum keys can secure data stored on a memory device. For example, one quantum key of a pair can be used to encrypt data and write the encrypted data to a memory of a server (e.g., on the cloud). The counterpart quantum key of the pair can be maintained for an arbitrary time period at a UE. When an app on the UE attempts to access the data stored on the server, the app can use the counterpart quantum key to decode the data. Hence, quantum keys can be used to secure any sensitive or valuable data that is accessible using an app on a mobile device, such as financial or bitcoin account apps, as well as healthcare or other apps that access sensitive or private data.

Computer System

Figure 4:
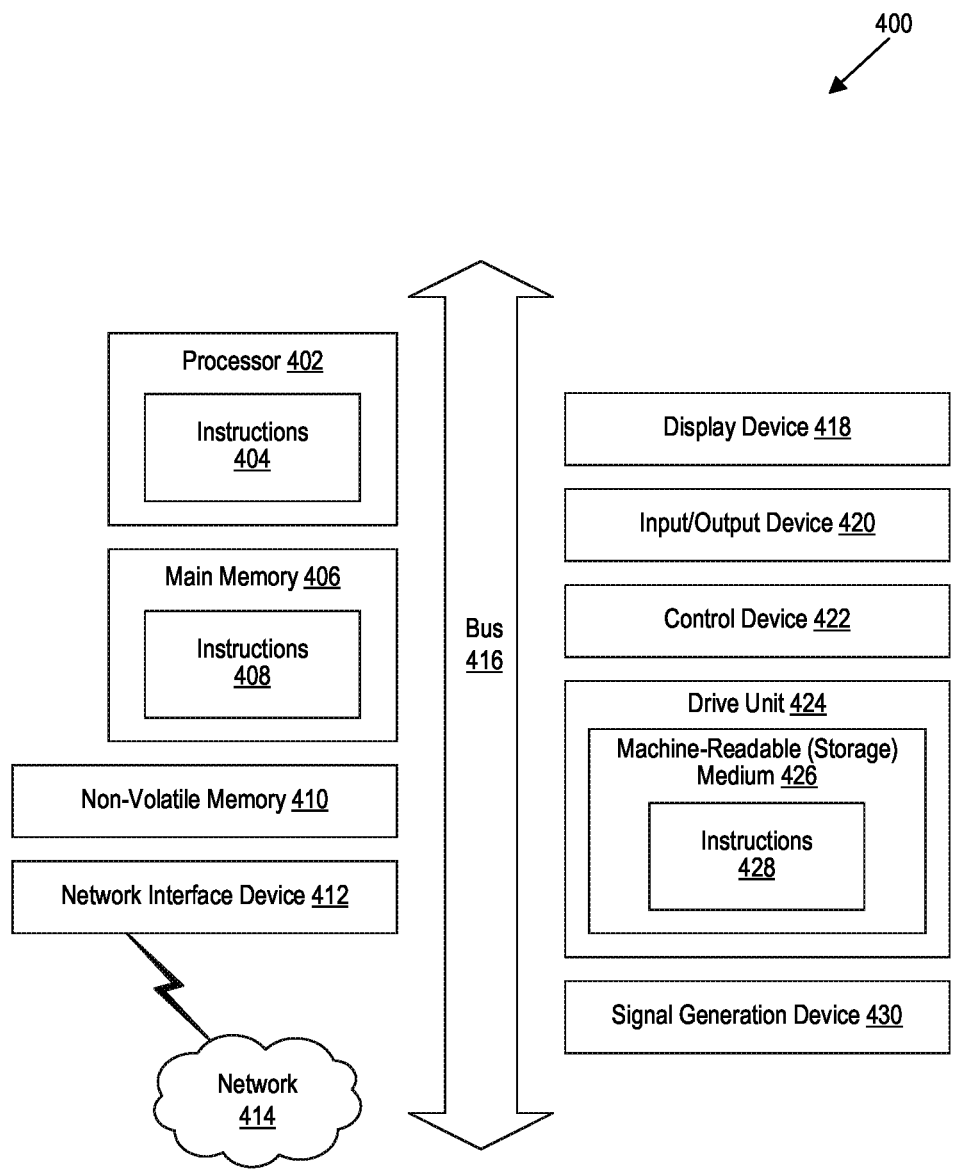
FIG. 4 is a block diagram that illustrates an example of a computer system in which at least some operations described herein can be implemented.

FIG. 4 is a block diagram that illustrates an example of a computer system 400 in which at least some operations described herein can be implemented. As shown, the computer system 400 can include: one or more processors 402, main memory 406, non-volatile memory 410, a network interface device 412, video display device 418, an input/output device 420, a control device 422 (e.g., keyboard and pointing device), a drive unit 424 that includes a storage medium 426, and a signal generation device 430 that are communicatively connected to a bus 416. The bus 416 represents one or more physical buses and/or point-to-point connections that are connected by appropriate bridges, adapters, or controllers. Various common components (e.g., cache memory) are omitted from FIG. 4 for brevity. Instead, the computer system 400 is intended to illustrate a hardware device on which components illustrated or described relative to the examples of the figures and any other components described in this specification can be implemented.

The computer system 400 can take any suitable physical form. For example, the computing system 400 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 400. In some implementation, the computer system 400 can be an embedded computer system, a system-on-chip (SOC), a single-board computer system (SBC) or a distributed system such as a mesh of computer systems or include one or more cloud components in one or more networks. Where appropriate, one or more computer systems 400 can perform operations in real-time, near real-time, or in batch mode.

The network interface device 412 enables the computing system 400 to mediate data in a network 414 with an entity that is external to the computing system 400 through any communication protocol supported by the computing system 400 and the external entity. Examples of the network interface device 412 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 406, non-volatile memory 410, machine-readable medium 426) can be local, remote, or distributed. Although shown as a single medium, the machine-readable medium 426 can include multiple media (e.g., a centralized/distributed database and/or associated caches and servers) that store one or more sets of instructions 428. The machine-readable (storage) medium 426 can include any medium that is capable of storing, encoding, or carrying a set of instructions for execution by the computing system 400. The machine-readable medium 426 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 410, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 404, 408, 428) set at various times in various memory and storage devices in computing device(s). When read and executed by the processor 402, the instruction(s) cause the computing system 400 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

The invention claimed is:

1. A non-transitory computer-readable storage medium carrying instructions, which, when executed by at least one data processor of a security system, cause the security system to:
   receive a request to secure a communication between a wireless endpoint device and a network access node of a wireless telecommunications network;
   generate, at a particle generator, a pair of particles including a first particle and a second particle that are quantumly entangled,
      wherein a quantum state of the first particle is correlated with a quantum state of the second particle;
   optically communicate the first particle from the particle generator to the wireless endpoint device when the wireless endpoint device is within Line-of-Sight (LOS) of an optical communication device coupled to the particle generator,
      wherein the quantum state of the first particle remains correlated with the quantum state of the second particle regardless of a distance between the first particle at the wireless endpoint device and the second particle at the network access node;
   generate a pair of cryptographic keys including a first encryption key at the wireless endpoint device and a second encryption key at the network access node based on the first particle and the second particle, respectively,
      wherein each of the pair of cryptographic keys is generated to have a matching key size where each bit is based on a particle of a pair of quantum entangled particles,
      wherein a strength of each of the pair of cryptographic keys increases in proportion to the key size;
      wherein the key size is any of 8-bit, 64-bit, 128-bit, or 256-bit;

process the communication between the wireless endpoint device and the network access node based on the pair of cryptographic keys,
  wherein the communication is secure due to the pair of particles being quantumly entangled, and
  wherein quantum states of the pair of particles relate to physical properties measured including a position, momentum, spin, and/or polarization of each particle;
maintain secure communication by periodically generating a different set of pairs of entangled particles to distribute for the wireless endpoint device and the network access node to address wave function collapse of the pair of particles resulting from measurement of the physical properties,
  wherein a frequency of the generation of the different set of pairs of entangled particles varies based on a security level for the communication between the wireless endpoint device and the network access node; and
generate cryptographic keys for the wireless endpoint device and the network access node based on respective sets of pairs of entangled particles.

2. The non-transitory computer-readable storage medium of claim 1, wherein the security system is further caused to, prior to generating the pair of cryptographic keys:
  optically communicate the second particle to the network access node when within LOS of an optical communication device coupled to the particle generator,
    wherein the pair of particles are optically communicated via respective lasers generated by one or more optical communication devices.

3. The non-transitory computer-readable storage medium of claim 1, wherein the security system is further caused to, prior to generating the pair of cryptographic keys:
  optically communicate the second particle to the network access node over a fiber optic cable couple to the particle generator,
    wherein the first particle is optically communicated via a pulsed laser from the particle generator to the wireless endpoint device.

4. The non-transitory computer-readable storage medium of claim 1:
  wherein the particle generator and the network access node are co-located, and
  wherein the wireless endpoint device is a mobile user device that is intermittently within LOS of the optical communication device coupled to the particle generator.

5. The non-transitory computer-readable storage medium of claim 1:
  wherein the particle generator and the network access node are co-located,
  wherein the wireless endpoint device is a fixed-wireless access device that is continuously within LOS of the optical communication device, and
  wherein the optical communication device includes a laser generator, and the first particle is optically communicated to the fixed wireless access device via a laser.

6. The non-transitory computer-readable storage medium of claim 1:
  wherein the wireless endpoint device is a fixed-wireless access device, and
  wherein the first particle is optically communicated to the fixed-wireless access device over a fiber optic cable coupled to the particle generator.

7. The non-transitory computer-readable storage medium of claim 1:
  wherein the particle generator is remotely located from the network access node,
  wherein the wireless endpoint device is a mobile user device that is intermittently within LOS of the optical communication device, and
  wherein the network access node is a 5G New Radio (NR) base station at a fixed location and is continuously within LOS of the optical communication device.

8. The non-transitory computer-readable storage medium of claim 1:
  wherein the wireless telecommunications network includes a 5G network, and
  wherein the particle generator is one of multiple particle generators distributed at different locations in a coverage area of the 5G network.

9. The non-transitory computer-readable storage medium of claim 1, wherein the security system is further caused to:
  continuously generate a stream of entangled particles for the wireless endpoint device and the network access node while the communication is ongoing between the wireless endpoint device and the network access node; and
  dynamically generate cryptographic keys for the wireless endpoint device and the network access node based on the stream of entangled particles.

10. The non-transitory computer-readable storage medium of claim 1, wherein the security system is further caused to:
  render the pair of cryptographic keys inoperable due to the pair of particles being disentangled; and
  generate an alert indicating that at least one of the pair of particles has been compromised.

* * * * *